(12) United States Patent
Goldwater (10) Patent No.: US 8,830,045 B2
(45) Date of Patent: Sep. 9, 2014

(54) ROTATING WHEEL ELECTRONIC DISPLAY APPARATUS

(76) Inventor: Dan Goldwater, Amherst, MA (US)

( * ) Notice: Subject to any disclaimer, the term of this patent is extended or adjusted under 35 U.S.C. 154(b) by 544 days.

(21) Appl. No.: 13/023,967

(22) Filed: Feb. 9, 2011

(65) Prior Publication Data
US 2012/0200401 A1    Aug. 9, 2012

(51) Int. Cl.
*B62J 3/00* (2006.01)
*B62J 6/20* (2006.01)

(52) U.S. Cl.
CPC .................................. *B62J 6/20* (2013.01)
USPC ........ 340/432; 340/427; 340/815.45; 345/39; 362/473

(58) Field of Classification Search
USPC .......... 340/427, 432, 815.45; 345/39; 362/473
See application file for complete search history.

(56) References Cited

U.S. PATENT DOCUMENTS

| | | | |
|---|---|---|---|
| 4,135,229 A | 1/1979 | Modurkay | |
| 4,796,972 A | 1/1989 | Thomas et al. | |
| 5,032,098 A | 7/1991 | Balogh et al. | |
| 5,057,827 A | 10/1991 | Nobile et al. | |
| 5,121,305 A | 6/1992 | Deed et al. | |
| 5,302,965 A | 4/1994 | Belcher et al. | |
| 5,319,531 A | 6/1994 | Kutnyak | |
| 5,333,101 A | 7/1994 | McEvoy | |
| 5,418,697 A * | 5/1995 | Chiou ........................... | 362/473 |
| 5,584,562 A * | 12/1996 | Geran ........................... | 362/473 |
| 5,800,039 A | 9/1998 | Lee | |
| 5,844,377 A | 12/1998 | Anderson et al. | |
| 5,903,224 A * | 5/1999 | Reynolds ................. | 340/815.45 |
| 5,984,487 A | 11/1999 | McGhee | |
| 6,016,101 A | 1/2000 | Brown | |
| 6,072,386 A | 6/2000 | Yu | |
| 6,492,963 B1 * | 12/2002 | Hoch ............................... | 345/39 |
| 6,598,894 B1 | 7/2003 | Fuji et al. | |
| 7,079,042 B2 | 7/2006 | Reim | |
| 7,161,256 B2 | 1/2007 | Fang | |
| 7,271,813 B2 | 9/2007 | Gilbert | |
| 2008/0101053 A1 * | 5/2008 | Hoffman et al. ................ | 362/35 |
| 2008/0186155 A1 | 8/2008 | Spencer et al. | |

* cited by examiner

*Primary Examiner* — Brent Swarthout
(74) *Attorney, Agent, or Firm* — Porter, Wright, Morris & Arthur, LLP

(57) ABSTRACT

A light display is mounted on the spokes of a rotating bicycle wheel. The display includes a plurality of individual arrays of lights forming a set. The set of arrays are attached together into a single rigid light display apparatus attached to a spoke of the wheel at the tip of each array of lights. At least one sensors on the apparatus, senses the angular velocity and angular position of the rotating wheel. A microprocessor, is mounted on one of the arrays of lights and connected to the sensor, and is further connected to a shared electrical bus which traverses every array of lights. The shared electrical bus is formed by the electrical connection of all the arrays of lights in a line or loop topology. Each array of lights has at most two connection points to the shared electrical bus. The microprocessor modulates the plurality of arrays of lights via the shared electrical bus and without a direct connection to every array of lights. The arrays of lights are modulated according to a selected one of a plurality of display patterns and the sensed angular velocity and position of the rotating wheel, to form a stabilized, upright, forward-reading image on both sides of the wheel using persistence of vision of a viewer.

20 Claims, 7 Drawing Sheets

ROTATING WHEEL ELECTRONIC DISPLAY APPARATUS

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The field of the present invention relates to methods and display apparatus for producing displayed images within a rotating wheel using time/position multiplexing of lighting elements and persistence of vision of a viewer.

BACKGROUND OF THE INVENTION

The characteristic persistence of vision of human viewers has been used to advantage in previous display devices, including rotating wheel displays. U.S. Pat. No. 5,057,827 to Nobile et al., the disclosure of which is expressly incorporated herein in its entirety by reference, describes a motor actuated rotating member where an array of LEDs are turned on and off using time or position division multiplexing so that to an observer an image is generated over the path of the array.

U.S. Pat. No. 5,302,965 to Belcher et al., the disclosure of which is expressly incorporated herein in its entirety by reference, describes a rotating display device which rotates vertical columns of light emitting diodes. The light emitting diodes arranged in the columns sweep around a cylindrical surface. A control circuit turns the light emitting diodes on and off to provide an image display on the surface. The display device requires a complex electromechanical device with a motor for rotating the LED columns at a uniform rate of rotation.

U.S. Pat. No. 5,903,224 to Reynolds, the disclosure of which is expressly incorporated herein in its entirety by reference, describes a persistence of vision device for mounting on a spoked bicycle wheel. This device is a single large circular unit which mounts on the side of the wheel. Its design inherently precludes displaying images across the majority of the diameter of the wheel. Its design also precludes a protected placement within the spoked wheel. Its large single-piece circuit board is also comparatively very expensive to manufacture.

U.S. Pat. No. 6,072,386 to Yu, the disclosure of which is expressly incorporated herein in its entirety by reference, describes a persistence of vision device for mounting on a spoked bicycle wheel. This device consists of a single small integrated unit mounted onto the spokes of the wheel. The device's small size simplifies its attachment to the wheel but limits the size and complexity of the display it is capable of producing. Further, the device only emits light at one angular location on the wheel, which requires high rotation rates to produce a quality display.

U.S. Pat. No. 7,079,042 to Reim, the disclosure of which is expressly incorporated herein in its entirety by reference, describes a persistence of vision device for mounting on automobile wheels and hubs. The design of this device makes its use with bicycle wheels limited much like the Yu device.

U.S. Pat. No. 6,492,963 to Hoch, the disclosure of which is expressly incorporated herein in its entirety by reference, describes a persistence of vision device for mounting on a spoked bicycle wheel. This device includes of one or more arrays of lights, attached to spokes around the wheel and connected together via electrical cables.

U.S. Pat. Application Publication No. 2008/0101053 A1 of Hoffman et al., the disclosure of which is expressly incorporated herein in its entirety, describes a persistence of vision display device integrated into a car wheel. This device is entirely integrated into a car wheel hub in such a way that it cannot be applied to a bicycle wheel which is very different in its mechanical structure and attachment to the vehicle.

U.S. Pat. Application Publication No. 2008/0186155 A1 of Spencer et al., the disclosure of which is expressly incorporated herein in its entirety by reference, describes a persistence of vision display used as a display in a vehicle instrument cluster. This device requires a motor to spin the display device since a natural rotating member does not exist in the instrument cluster.

U.S. Pat. No. 7,161,256 to Fang, the disclosure of which is expressly incorporated herein in its entirety by reference, describes a persistence of vision display integrated into a fan. This device uses the fan blades for its base support structure and receives power through an inductive means from the non-rotating base. The device only has a display on one side of the fan.

U.S. Pat. No. 7,271,813 to Gilbert, the disclosure of which is expressly incorporated herein in its entirety by reference, describes a persistence of vision display device integrated into a car wheel. This device uses a computer for storage and recall of the images to be displayed, and a wireless communication between the non-moving computer and the moving portion of the display. This device is integrated into a car wheel such that it displays on the one visible side of the wheel.

Numerous implementations of bicycle wheel displays have been shown publicly by various parties, most are very similar to either the Hoch or Yu designs. The Hoch design has provided the highest displayed image quality of any bicycle wheel display available to date, however the Hoch has a number of problems that has limited its commercial success. Specifically, when configured using only a single array of lights the Hoch design requires very high wheel rotation rates to form a solid display image. Such rotation rates are inconvenient on a bicycle. As a result it is common practice to use the embodiment of the Hoch design with multiple individual arrays of lights, either electrically connected together with cables or not electrically connected together. In the case where the arrays are electrically connected, the required cables are expensive and difficult to manufacture in a way which can survive the harsh environmental conditions experienced on a bicycle wheel. In the case where the arrays are not electrically connected, each array requires its own microprocessor and batteries, significantly increasing cost and weight. Whether electrically connected or not, the use of multiple physically separate arrays inherently causes difficult installation and configuration for the user, since each array must be individually attached to the wheel, aligned mechanically, and configured electronically. Further, there is inherent excess weight due to the added hardware required for each array to be individually fully secured to the wheel, and inherently greater likelihood that an array will become loose. When using multiple individual arrays of lights connected together, the Hoch design is further impractical for larger numbers of arrays as each slave array must be individually connected to the master array. In order to allow the attachment of many slave arrays, many connectors are required on the master which adds to manufacturing cost and size, even though many users may never connect more than one or two slave arrays.

Accordingly, there is a need in the art for an improved electronic display apparatus for rotating wheels.

SUMMARY OF THE INVENTION

The present invention provides an electronic light display mounted on a rotating wheel that overcomes at least one of the above-noted problems of the prior art. Disclosed is a light display apparatus for mounting on a wheel. The apparatus comprises a set of at least two individual elongated light arrays, at least one of the elongated light arrays being a master light array. The elongated light arrays have two ends and at least one row of lights. The elongated light arrays have mechanical connections proximate one of the ends to mechanically connect adjacent ones of the elongated light arrays and electrical connections proximate the mechanical connections to electrically connect adjacent ones of the elongated light arrays. The set of individual elongated light arrays when connected mechanically at the mechanical connections form a single rigid assembly and the single rigid assembly is adapted to be attached to the wheel as a unit. The set of elongated light arrays when connected electrically at the electrical connections form an electrically conductive pathway traversing each of the elongated light arrays in the set. The electrically conductive pathway provides an electrical bus by which electrical power and electronic data can be shared between all of the elongated light arrays, and by which electronic data can be transmitted from the master array to each of the other elongated light arrays without an individual direct electrical connection. At least one sensor is mounted on the apparatus for determining angular velocity and position of the wheel. A microprocessor is mounted on the master light array and includes a memory storing at least one of a display pattern and a display pattern generation computer code. The microprocessor modulates the rows of lights according to the display pattern or the display pattern generation computer code and sensed velocity and position of the wheel to form an image using persistence of vision of a viewer.

Also disclosed is a light display apparatus for mounting on a wheel having spokes extending between a hub and a rim. The apparatus comprises a set of at least two individual elongated light arrays, at least one of the elongated light arrays being a master light array. The elongated light arrays have two ends and at least one row of lights. The elongated light arrays have mechanical connections proximate one of the ends to mechanically connect adjacent ones of the elongated light arrays and electrical connections proximate the mechanical connections to electrically connect adjacent ones of the elongated light arrays. The set of individual elongated light arrays when connected mechanically at the mechanical connections form a single rigid assembly. The single rigid assembly is adapted to be attached to the spokes of the wheel as a unit. The set of elongated light arrays when connected electrically at the electrical connections form an electrically conductive pathway traversing each of the elongated light arrays in the set. The electrically conductive pathway provides an electrical bus by which electrical power and electronic data can be shared between all of the elongated light arrays, and by which electronic data can be transmitted from the master array to each of the other elongated light arrays without an individual direct electrical connection. At least one sensor is mounted on the apparatus for determining angular velocity and position of the wheel. A microprocessor is mounted on the master light array and includes memory storing at least one of a display pattern and a display pattern generation computer code. The microprocessor modulates the rows of lights according to the display pattern or the display pattern generation computer code and sensed velocity and position of the wheel to form an image using persistence of vision of a viewer.

Also disclosed is a bicycle comprising a pair of rotating wheels each having spokes extending between a hub and a rim and a light display apparatus secured to one of the wheels. The light display apparatus comprises a set of at least two individual elongated light arrays, at least one of the elongated light arrays being a master light array. The elongated light arrays have two ends and at least one row of lights. The elongated light arrays have mechanical connections proximate one of the ends and mechanically connecting adjacent ones of the elongated light arrays and electrical connections proximate the mechanical connections and electrically connecting adjacent ones of the elongated light arrays. The set of individual elongated light arrays form a single rigid assembly. The single rigid assembly is attached to the spokes of the wheel as a unit. The set of elongated light arrays form an electrically conductive pathway traversing each of the elongated light arrays in the set. The electrically conductive pathway provides an electrical bus by which electrical power and electronic data can be shared between all of the elongated light arrays, and by which electronic data can be transmitted from the master array to each of the other elongated light arrays without an individual direct electrical connection. At least one sensor is mounted on the apparatus for determining angular velocity and position of the wheel. A microprocessor is mounted on the master light array and includes memory storing at least one of a display pattern and a display pattern generation computer code. The microprocessor modulates the rows of lights according to the display pattern or the display pattern generation computer code and sensed velocity and position of the wheel to form an image using persistence of vision of a viewer.

From the foregoing disclosure and the following more detailed description of various preferred embodiments it will be apparent to those skilled in the art that the present invention provides a significant advance in the technology and art of rotating wheel electronic displays. Particularly significant in this regard is the potential the invention affords for providing an easy to install, durable, reliable, and relatively inexpensive system. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

It should be understood that the appended drawings are not necessarily to scale, presenting a somewhat simplified representation of various preferred features illustrative of the basic principles of the invention. The specific design features of the electronic display apparatus as disclosed herein, including, for example, specific dimensions, orientations, and shapes will be determined in part by the particular intended wheels upon which the apparatus is designed to attach. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the components illustrated in the drawings.

The following reference numbers are used in the specification and drawings:

| | |
|---|---|
| 100 | Electronic light display apparatus |
| 101 | Master light array |
| 102 | Slave light array |
| 103 | Slave light array |
| 104 | Slave light array |
| 105 | Row of LED's |
| 106 | Circuit board |
| 107 | Master electronic control circuitry |
| 109 | Common Screw |
| 110 | Slave electronic control circuitry |
| 111 | Shared electrical bus |
| 112 | Mechanical attachment area |
| 120 | 2-axis acceleration sensor |
| 121 | Magnetic sensor |
| 122 | Magnet |
| 150 | Hole in light array |
| 151 | Spoke of Bicycle wheel |
| 152 | Adjustable plastic strap |
| 153 | Rubber spacer |
| 154 | Hub of bicycle wheel |
| 155 | Rim of bicycle wheel |
| 156 | Outer tip of light array |
| 157 | Adjustable plastic strap |
| 158 | Hole in light array |
| 160 | Printed circuit board wires/portion of shared electrical bus |
| 161 | Alignment screw hole |
| 162 | Height spacer |
| 163 | Common nuts |
| 164 | Printed circuit board wires/portion of shared electrical bus |
| 165 | Electrical connector |
| 166 | Electrical connector |
| 167 | Alignment screw hole |
| 170 | Microprocessor |
| 171 | User input circuitry |
| 172 | Electronic memory |
| 173 | Light array control circuitry |
| 174 | Battery |
| 175 | Portion of shared electrical bus |
| 200 | Bicycle |
| 201 | Bicycle wheel |
| 202 | Bicycle frame |
| 203 | Inner end of array |

DETAILED DESCRIPTION OF CERTAIN PREFERRED EMBODIMENTS

It will be apparent to those skilled in the art, that is, to those who have knowledge or experience in this area of technology, that many uses and design variations are possible for the rotating wheel electronic display apparatus disclosed herein. The following detailed discussion of various alternative and preferred embodiments will illustrate the general principles of the invention with reference to specific embodiments. Other embodiments suitable for other applications will be apparent to those skilled in the art given the benefit of this disclosure.

In this specification and claims, the term "POV" refers to the Persistence Of Vision effect of the human eye. In this specification and claims, the term "linear bus" refers to an electrically conductive pathway having the topology of a line. In this specification and claims, the term "loop bus" refers to an electrically conductive pathway having the topology of a loop. In this specification and claims, the terms "shared electrical bus" and "shared bus" refer to either a loop bus or a linear bus.

Figure 1:
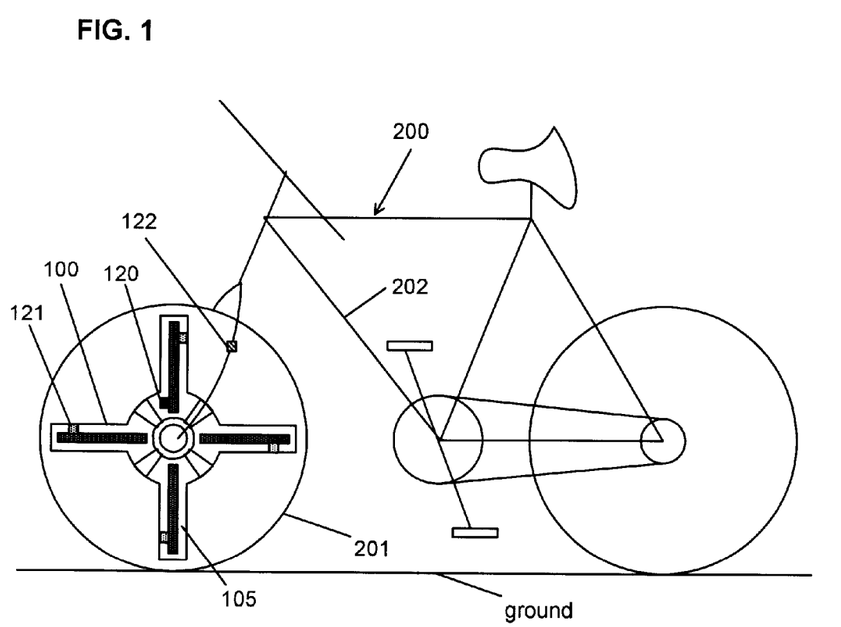
FIG. 1 is a diagrammatic view of an electronic display apparatus mounted on a bicycle according to the present invention.

FIG. 1 illustrates an electronic light display apparatus 100 attached to a forward wheel 201 of a bicycle 200 according to the present invention. When a cyclist rides the bicycle 200, the assembled light display apparatus 100 attached to bicycle wheel 201 rotates as the wheel 201 spins. The motion of four magnetic sensors 121 relative to a magnet 122 attached to a frame 202 of the bicycle 200 is detected by a microprocessor 170 (FIG. 5) to determine the speed and direction of rotation. The method of determining rotational speed and direction using magnetic sensors is well known in the art and used in multitudes of applications. The orientation and motion of a 2-axis acceleration sensor 120 is detected by the microprocessor 170 and allows it to determine the angle of the ground with respect to the light display apparatus 100. With this information, the microprocessor 170 can: (a) synchronize images and patterns displayed by a row of lights 105 to the speed of the wheel 201, (b) such that they always appear right-side-up with respect to the ground, (c) such that they appear forwards-reading no matter the rotation direction of the wheel 201 or the side of the bicycle 200 they are viewed on. Because the light display apparatus 100 comprises a plurality of light arrays 101-104 and is swept during motion, it appears to the viewer as if the majority of the wheel 201 is illuminated.

Figure 2:
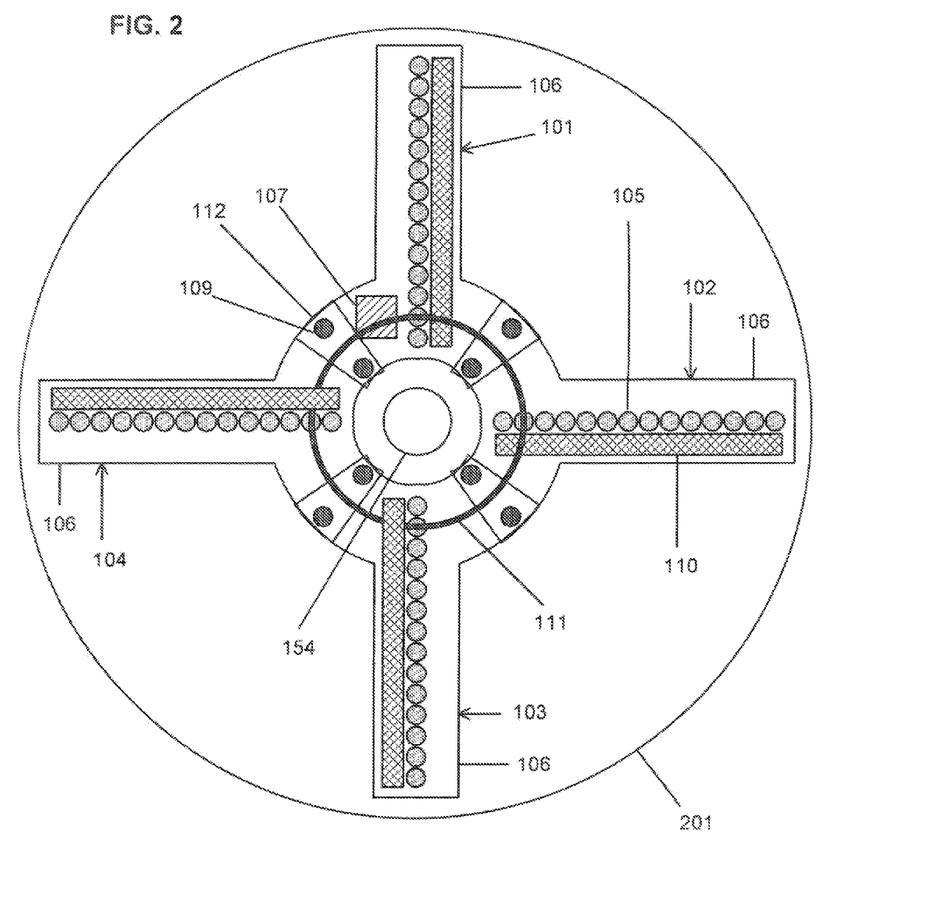
FIG. 2 is an enlarged diagrammatic view of the electronic display apparatus of FIG. 1 wherein the display apparatus comprises a set of four light arrays mounted on spokes of a wheel of the bicycle.

As best shown in FIG. 2, the illustrated light display apparatus 100 comprises four elongated light arrays 101-104 each spaced about 90 degrees from one another and substantially perpendicular to a rotational axis of the wheel 201 so that they generally extend in a radial direction from the rotational axis of the wheel 201. It is noted that any other suitable quantity of the light arrays 101-104 can alternatively be utilized as long as there is a set of at least two of the light arrays 101-104. In the illustrated embodiment each light array 101-104 comprises a fiberglass circuit board 106 as its sole structural component, such material is flat, stiff and strong and is commonly available and easily manufactured in any shape and with any needed circuitry. A plastic case or housing can be provided around the circuit board 106 that can also be used as part of the structure. Control circuit components and LEDs are mounted directly to the surface of the circuit board 106. Each illustrated array 101-104 includes two rows of independently controlled lights 105 in the form of LEDs mounted perpendicular to the rotation of the wheel 201, one row 105 on either side of the array 101-104 facing in opposed directions such that one row of lights 105 is visible on one side of the wheel 201 and one row of lights 105 is visible on the other side of the wheel. This configuration allows different images, animations and videos to be displayed on the two sides of the wheel 201. In particular text can be displayed in proper reading order on both sides.

In an alternative embodiment, each of the arrays 101-104 has only one row 105 of lights in the form of LED's mounted on one side of the wheel 201, such as would be appropriate for a vehicle such as an automobile where one side of the wheel 201 is not visible.

The illustrated light display apparatus 100 is comprised of a set of four of the light arrays 101-104, where one is a master array 101 and the other three are slave arrays 102-104, which are similar in appearance and construction. The illustrated light display apparatus 100 is adapted for mounting on the spokes 151 of the bicycle wheel 201. While the illustrated light display apparatus 100 mounted to the front wheel it can be mounted to either the front, back or both wheels 201. It should be understood that the light display apparatus 100 can also be attached to other types of rotating wheels and/or other rotating objects.

At least one of the arrays 101-104, is provided with master electronic control circuitry 107 so that it is a "master" array 101, and the others are "slave" arrays 102-104. All of the illustrated arrays 101-104 have slave electronic control circuitry 110. The four arrays 101-104 together comprise a set of arrays 101-104. The four illustrated arrays 101-104 physically overlap at mechanical attachment or connection areas or locations 112 and at these mechanical connection locations 112 are mechanically fastened together with screws 109 to form the rigid assembled light display apparatus 100. It is noted that any other suitable type of mechanical connections can alternatively be utilized.

Also present at the illustrated mechanical connection locations 112 are electrical connections in the form of "Board-To-Board" (BTB) electrical connectors 165, 166. The BTB electrical connectors 165, 166 connect the printed circuit boards 106. Each of the BTB electrical connectors 165, 166 includes a housing and a plurality of terminals connected to the associated printed circuit board 106. The housing comprises an insulative material such as, for example, plastic which the terminals comprise a conductive material such as, for example, a copper alloy plated to improve conductivity and antirust. The terminals transmit the current/signal between the printed circuit boards 106 connected by BTB electrical connectors 165, 166. The BTB connectors 165, 166 can be of either the through hole mounting type or the surface mount mounting type. It is noted that any other suitable type of electrical connectors and/or electrical connections can alternatively be utilized.

Figure 6:
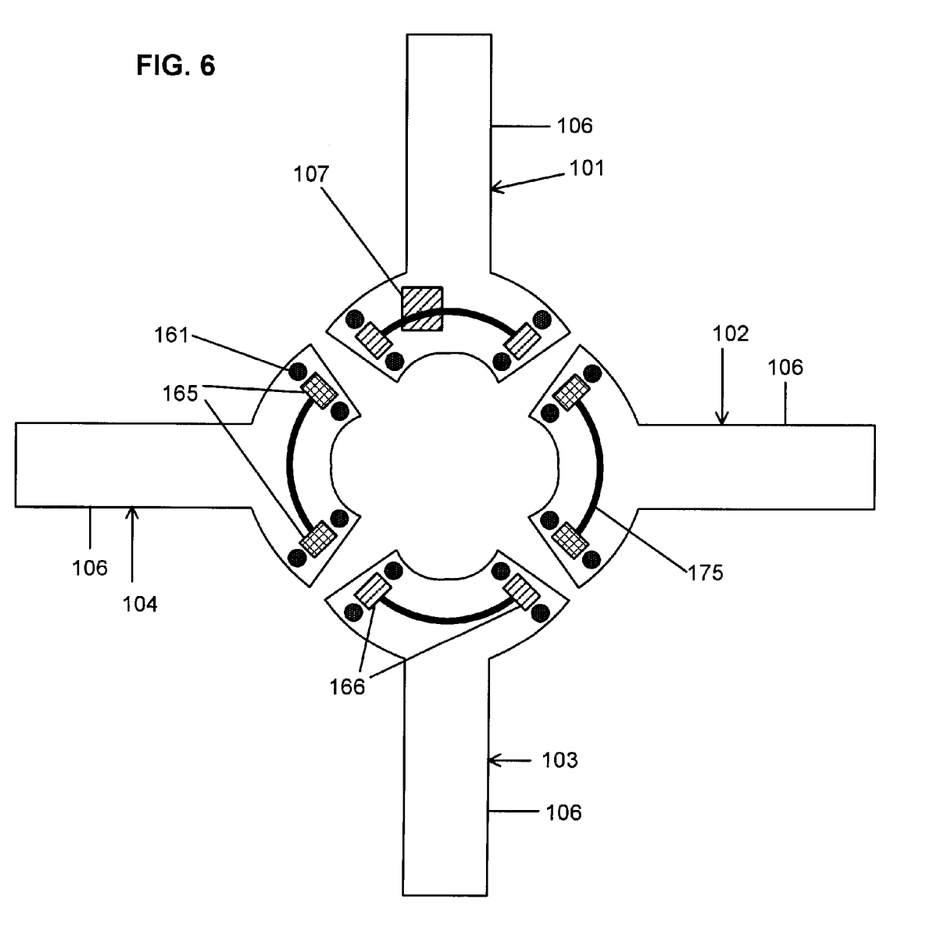
FIG. 6 is an exploded diagrammatic view of the four light arrays of the electronic display apparatus of FIGS. 1 to 5 showing a shared electrical bus in the form of a loop bus.
Figure 7:
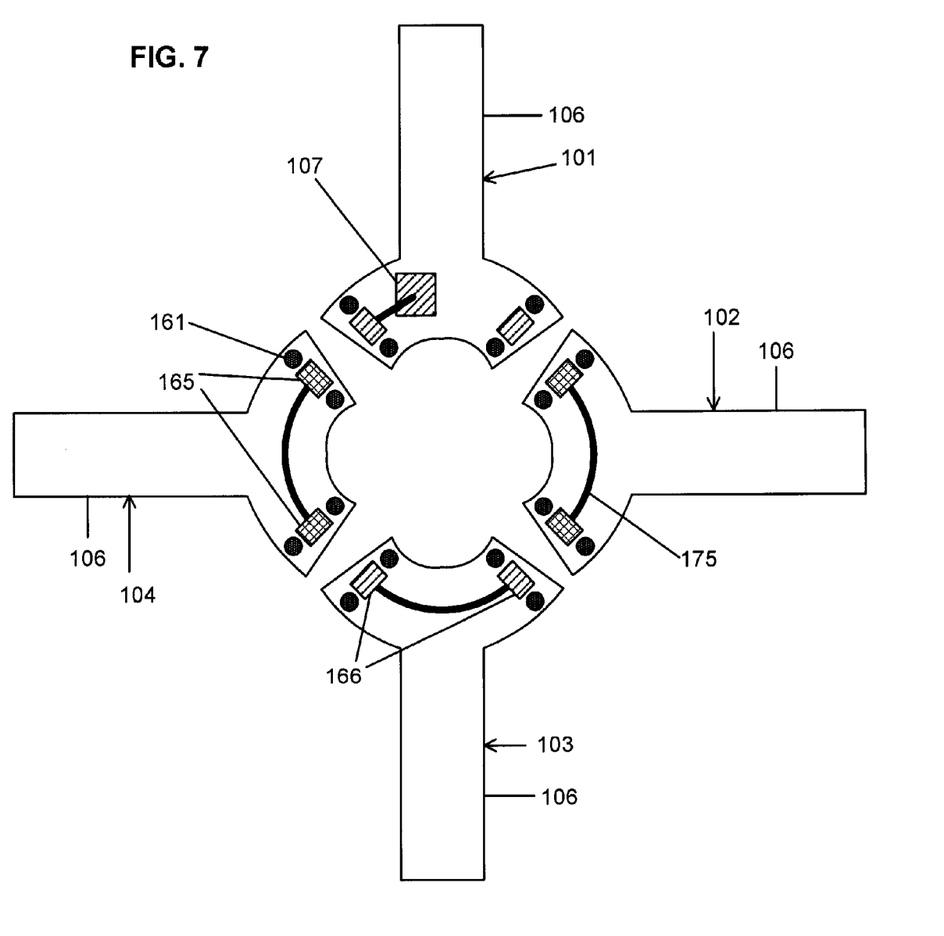
FIG. 7 is an exploded diagrammatic view similar to FIG. 6 but showing an alternative embodiment having a shared electrical bus in the form of a linear bus.

In the illustrated light display apparatus 100 all four of the light arrays 101-104 are electrically connected together by a shared electrical bus 111 which traverses all four of the light arrays 101-104, passing through the electrical connectors 165, 166 at each of the four mechanical connection locations 112. As shown in FIG. 6, the illustrated shared electrical bus 111 has the topology of a loop or is a loop bus. With the loop shared electrical bus 111, there are two pathways along the shared electrical bus 111 for electrical signals between the master electronic control circuit 107 and all of the slave electronic control circuits 100. It is noted that any other suitable type of electrical connections can alternatively be utilized. FIG. 7 shows an alternative embodiment wherein the master electronic control circuitry 107 is only connected to one of the BTB electronic connectors 166 instead of both, such that the shared electrical buss 111 has the topology of a line or is a linear bus. With the linear shared electrical bus 111, there is now only one pathway along the shared electrical bus 111 for electrical signals between the master electronic control circuit 107 and all of the slave electronic control circuits 100. The linear bus can be formed in other suitable manner such as, for example the BTB electrical connectors can be unconnected or eliminated at one of the mechanical connection locations 112.

Each illustrated array 101-104 further includes two rows of sixteen "full color" RGB LEDs 105, where one row is on each side of the array 101-104. It is noted that any other suitable type of lights can alternatively be utilized, any other suitable quantity of rows of lights can alternatively be utilized, any other suitable quantity of lights in a row can alternatively be utilized, and/or any other suitable color of lights can alternatively be utilized. The number of LEDs can be adjusted for different sized array lengths to fit different sized wheels, or for cost. Each illustrated array's slave electronic control circuitry 110 includes light array control circuitry 173, one of the magnetic sensors 121, and a battery. Each illustrated array's slave electronic control circuitry 110 is electrically connected to the shared electrical bus 111. The illustrated master electronic control circuitry 107 includes a microprocessor 170 with memory 172, a 2-axis acceleration sensor 120, and user input circuitry 171. The illustrated master electronic control circuitry 107 is electrically connected to the shared electrical bus 111.

In an alternative embodiment, the master array 101 does not include the separate slave electronic control circuitry 110 which is connected to the shared electrical bus 111, instead has that circuitry 110 combined with the master electronic control circuitry 107.

The battery 174 configuration of the light display apparatus 100 is flexible and can be readily designed to accommodate a variety of types and configurations of batteries. In a preferred embodiment using standard Alkaline or Nickel-Metal-Hydride batteries providing 1.2-1.5V per cell, each array 101-104 has one battery 174 and the batteries 174 are in a series configuration to produce between 4.8V and 6.0V total to power the apparatus. In a preferred embodiment using Rechargeable Lithium batteries providing approximately 3.6V per cell, cells are configured in parallel, and some arrays 101-104 may be configured with no cells while others may be configured with one or more than one in order to optimize the available space and weighting of the arrays 101-104. A voltage step-up or step-down converter can also be used to increase power efficiency and support multiple battery types without reconfiguration. In the illustrated embodiment the cells 174 are arranged symmetrically on the arrays 101-104 so as to provide even weighting as the light display assembly 100 rotates.

Figure 3:
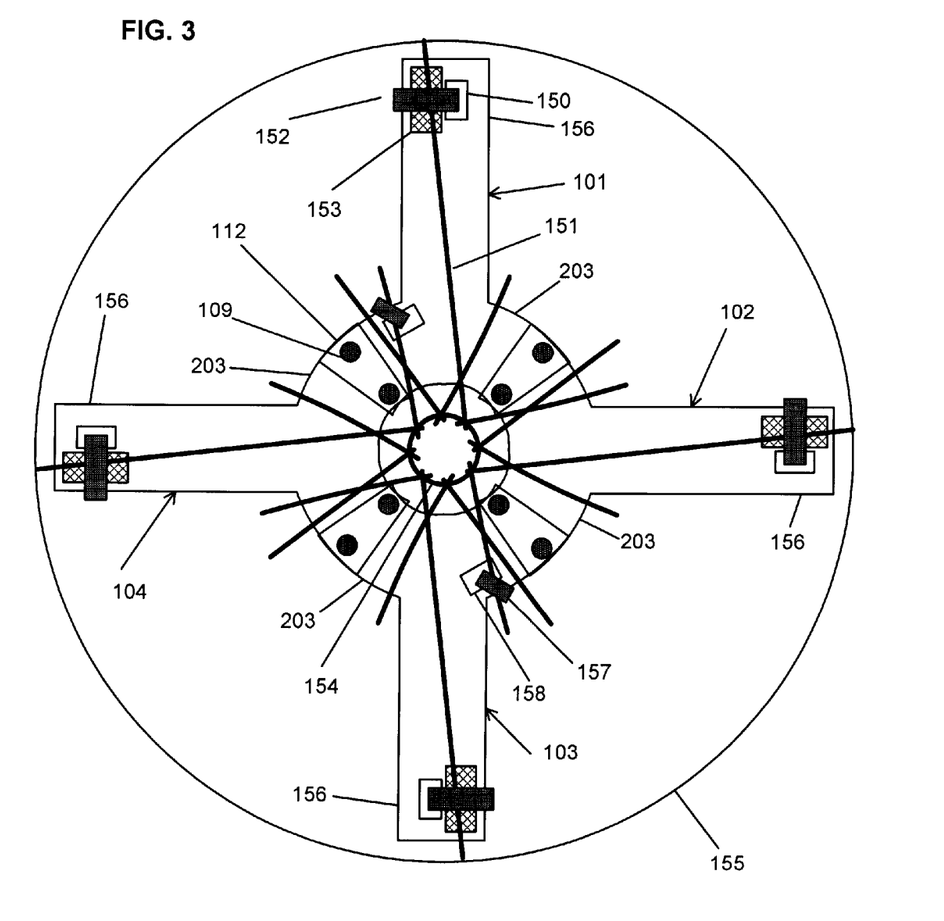
FIG. 3 is a diagrammatic view similar to FIG. 2 but showing a method of attachment of the display apparatus to the spoked bicycle wheel.

As shown in FIG. 3, the illustrated light display apparatus 100 is attached to the spokes 151 of the bicycle wheel 201. In the illustrated embodiment, the light display apparatus 100 is assembled within the plane of the wheel 201 with spokes 151 on either side of it, this protects the light display apparatus 100 from physical damage while in use. The spokes 151 are connected from a central hub 154 of the wheel 201 to a rim 155 of the wheel 201 and encircling the hub 154. Also in the illustrated embodiment, the light display apparatus 100 is attached to the spokes 151 of the wheel 201 at outer tips 156 of the arrays 101-104 near the wheel rim 155. Each array outer tip 156 is attached to one spoke 151 by means of a standard off-the-shelf commercially available adjustable plastic strap 152, commonly known as a "cable-tie". Each illustrated array 101-104 is provided with a hole 150 near its outer tip 156, the plastic strap 152 forms a loop which goes through the hole 150, around the spoke 151, and around a portion of the outer tip 156 of the array 101-104. The illustrated embodiment has a rectangular rubber spacer 153 provided inside the loop of the plastic strap 152, compressed between the spoke 151 and the tip 156 of the array 101-104 when the plastic strap 152 is tightened such that it creates a high-friction connection between the spoke 151 and the array 101-104. The illustrated embodiment using a plastic strap 152 and compressed high-friction rubber spacer 153 provides vibration dampening, absorbs mechanical misalignments between the array 101-104 and the spoke 151, prevents damage to the spoke 151 and the attached array 101-104, and works on a wide variety of wheel sizes and constructions.

In the illustrated embodiment, there are also two or more adjustable plastic straps 157 affixing an inner end 203 of the light display apparatus 100 to the spokes 151 near the hub 154 which eliminates vibration of the light display apparatus 100 perpendicular to the plane of the wheel 201. This connection can be made for example using two additional holes 158 near the inner end 203 of the arrays 101-104 and the plastic straps 157 which each loop through one of the holes 158 and around one of the spokes 151.

While the illustrated embodiment of the light display apparatus 100 has many advantages, there are other methods by which the light display apparatus 100 can be attached to a wheel 201. For example, the outer tips 156 of the arrays can be attached to two of the spokes 151 each for additional support, or they can be attached using screws. For examples of such attachments, see U.S. patent Ser. No. 12/478,823, the disclosure of which is expressly incorporated herein in its entirety by reference. Also for example, the inner end 203 of the light display apparatus 100 can be attached to the hub 154 with a load bearing connection, with the array outer tips 156 attached using a non-load-bearing connection.

In the illustrated embodiment where the light display apparatus 100 is connected to spokes 151 on the wheel 201 at the outer tips 156 of the arrays 101-104, attachment is simplified when the number of spokes 151 in the wheel 201 is a multiple of the number of arrays 101-104 in the light display apparatus 100, such that the light display apparatus 100 may be easily positioned in the wheel 201 with one spoke 151 directly adjacent to each array outer tip 156. For this reason, the illustrated embodiment of the light display apparatus 100 comprises four light arrays 101-104, as most bicycle wheels 201 have a number of spokes 151 which is a multiple of four, and because with only one or two arrays 101-104 a bicycle must be traveling very rapidly in order for the light display apparatus 100 to produce a fully coherent image in the wheel 201.

In an alternative embodiment, the outer tips 156 of the arrays 101-104 have an enlarged area for attachment to the spokes 151, providing for attachment to wheels 201 with a non-multiple number of spokes 151. For an example of such an enlarged area, see U.S. patent Ser. No. 12/478,823, the disclosure of which is expressly incorporated herein in its entirety by reference. In this alternative embodiment three or five or six arrays 101-104 may be easily used, each array 101-104 being otherwise similar to the illustrated embodiment.

Figure 4:
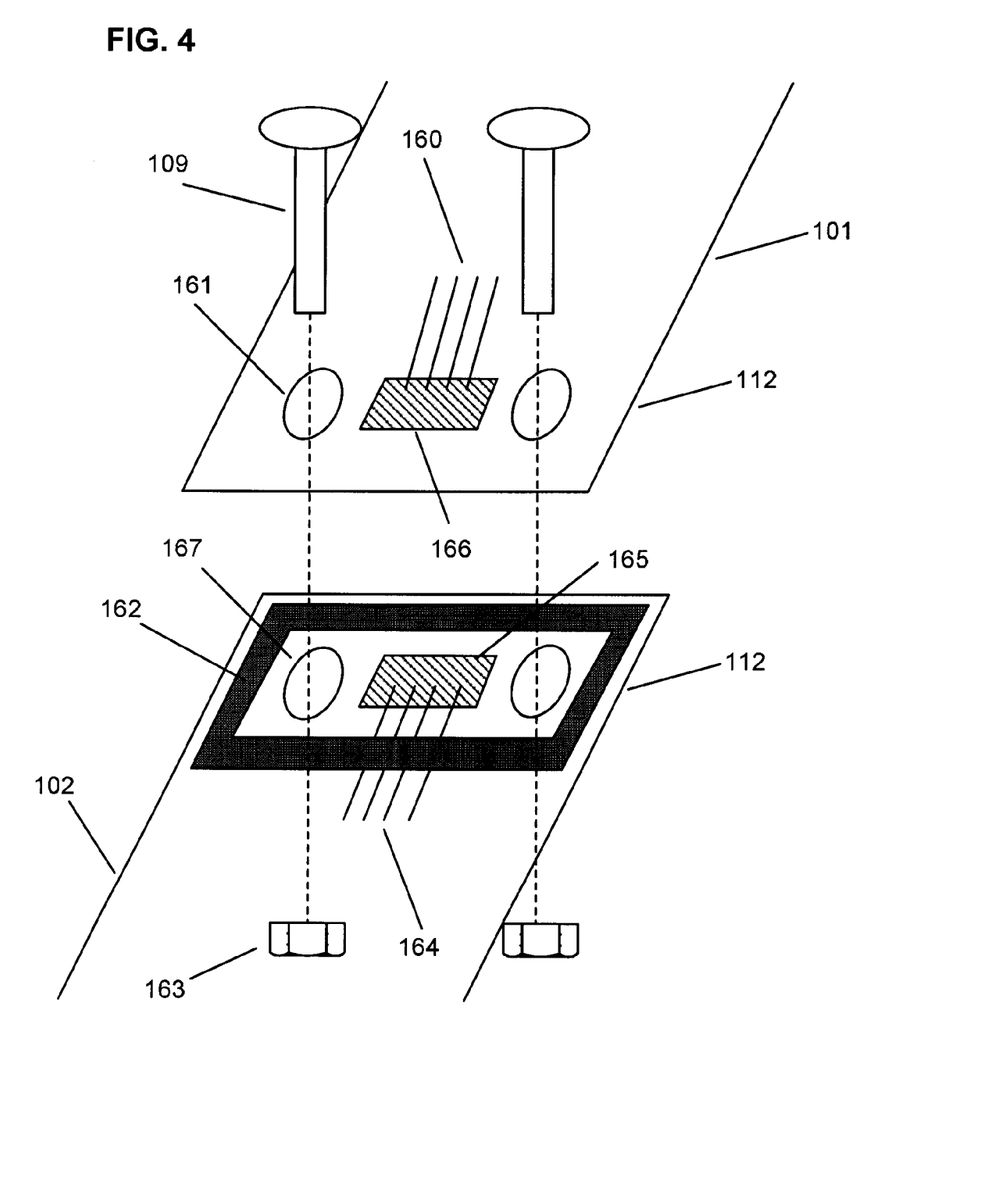
FIG. 4 is an exploded, fragmented perspective view of mechanical and electrical connections between two of the light arrays of the display apparatus of FIGS. 1 to 3.

As best shown in FIG. 4, the mechanical attachment area 112 on any two light arrays 101, 102 can provide the correct proximity and alignment required for use of the two mating halves of the BTB electrical connector 165, 166 to electrically connect two of the arrays 101-104. A wide variety of BTB electrical connectors 165, 166 exist in the market and are known to those skilled in the art. Compared to wired cables with connectors, the BTB electrical connectors 165, 166 provide reduced manufacturing costs and reduced size. The BTB electrical connectors 165, 166 require a specific close proximity, accurate alignment and rigid attachment of the arrays 101-104. In the illustrated embodiment, two screw holes 161 are provided in the array 101 and two matching screw holes 167 are provided in the adjacent array 102 at the attachment area 112 on opposed lateral sides of the BTB electrical connectors 165, 166. By means of common screws 109, common nuts 163, and a spacer 162, the two arrays 101, 102 can be accurately aligned and rigidly attached. Each of the illustrated arrays 101-104 are connected to its two adjacent arrays 101-104 in the same manner. The illustrated height spacer 162 is located between the two arrays 101-104 in close proximity to the screw holes 167 and the BTB electrical connector bottom half 165. The height of the spacer 162 is adjusted to meet the specific proximity requirement of the BTB electrical connector 165,166, and the spacer 162 can be made from stiff rubber and encircle the connector 165, 166 in order to additionally form a gasket which seals the BTB electrical connectors 165, 166 against dust and water. It is noted that the BTB electrical connectors 165, 166 can alternatively be spaced and/or sealed in other suitable manners. Typically the BTB electrical connector top half 166 is attached to the underside of the array 101 and the BTB electrical connector bottom half 165 is attached to the above side of the other array 102, however the various common BTB electrical connectors 165, 166 may attach in other ways. With some common BTB electrical connectors, a portion of the connector top half 166 may be exposed on the above side of the array 101 and/or a portion of the BTB electrical connector bottom half 165 may be exposed on the below side of the array 102. In these cases, an additional waterproofing means such as, for example, a rubber cap may be affixed on the above side of the array 101 over the exposed side of the BTB electrical connector 166 and/or the below side of the array 102 over the exposed side of the BTB electrical connector 165.

In the illustrated embodiment, the primary structural element of the arrays 101-104 is the printed circuit board 106, and printed circuit wires 160,164 are routed on the printed circuit board 106 to the BTB electrical connectors 165, 166 to form a portion 175 of the shared electrical bus 111 on each of the printed circuit boards 106. When all the arrays 101-104 in a set are attached and connected, the shared electrical bus 111 comprises the printed circuit wires 160,164 on each of the arrays 101-104 along with the mated BTB electrical connector halves 165, 166 on each of the arrays 101-104. The illustrated printed circuit boards 106 are elongate in the radial direction for the row of lights 105 and has the first or outer end 156 and the second or inner end 203 between which the row of lights 105 extends. The illustrated printed circuit boards 106 are sized so that the outer end or tip 156 is located near the wheel rim 154 and the inner end 203 is located near the wheel hub 154. The illustrated inner end 203 is sized and shaped to wrap partially around the wheel hub 154 with the connection locations 112 on opposed sides of the inner end 203 so that collectively the arrays 101-104 extend entirely about the wheel hub 154 with the rows of lights 105 spaced substantially ninety degrees apart. The illustrated printed circuit wires 160, 164 extend laterally between the connection locations 112 on opposed sides the inner ends 203 of the arrays 101-104 so that the shared electrical bus 111 extends entirely about the wheel hub 154. The illustrated inner ends 203 are curved or arcuate so that they collectively fully encircle the wheel hub 154 but it is noted that any other suitable shape can alternatively be utilized. It is noted that the arrays 101-104 can alternatively have any other suitable size and/or shape. The printed circuit boards 106 can be coated on both sides with a clear polyurethane rubber or the like. This coating provides environmental protection and increased strength and abrasion resistance of the structural elements.

In an alternative embodiment, wired electrical cables with electrical connectors are used, one end of the electrical cable being fixed to one array 101-104 and the other end of the electrical cable having a pluggable electrical connector which attaches to the other array 101-104, or both ends of the electrical cable having a pluggable connector.

In an alternative embodiment, the printed circuit boards 106 are encased in at least one rigid protective shell or housing which can comprise, for example, clear plastic. In this alternative embodiment, the printed circuit boards 106 are not the sole structural element of the arrays 101-104

Figure 5:
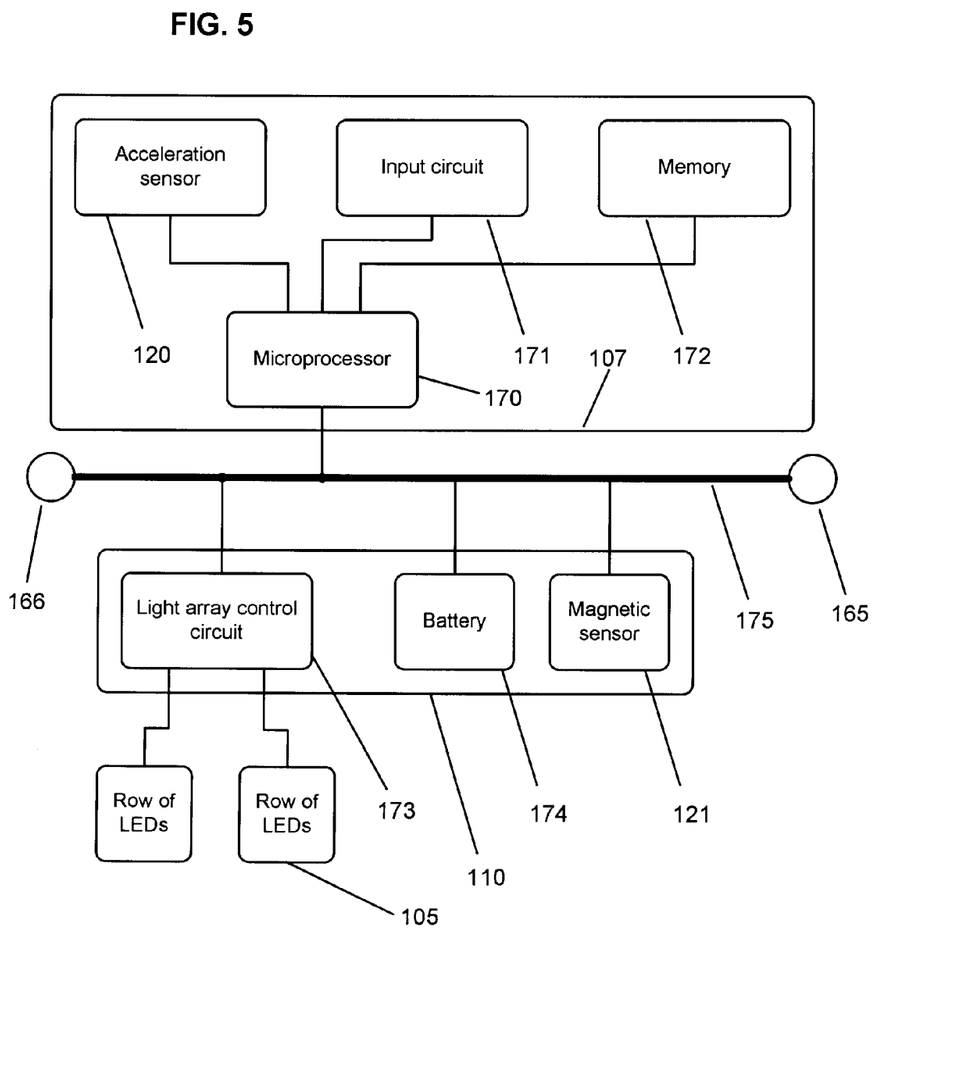
FIG. 5 is a block diagram of electrical circuit modules and the electrical connections between them for the electronic display of FIGS. 1 to 4.

As shown in FIG. 5, the illustrated electronic circuitry on a single array 101-104 is comprised of a slave electronic control circuitry 110, the two rows of LEDs 105, a portion 175 of the shared electrical bus 111, and the electrical connectors 165, 166. If the array 101-104 is the master array 101, it further includes master electronic control circuitry 107 and can be otherwise similar to the other arrays 102-104 which are not the master array 101.

The illustrated master electronic control circuitry 107 includes a microprocessor 170, an acceleration sensor 120, a data user input circuitry 171 which may include buttons, a wireless data interface, and a pluggable data interface, and electronic memory 172. The user input circuitry 171 can include buttons, an infrared receiver, a radio receiver, a serial port, a USB port, a combination thereof, or other user input sensors for providing the user a means to control and configure the light display apparatus 100 either before or during operation. The radio can be a Bluetooth radio, Zigbee radio, Wifi radio, or other commonly available type of radio. The electronic memory 172 can be included in the microprocessor 170 or it can be a separate device. The electronic memory 172 can be any commonly available EEPROM or FLASH memory device. The illustrated microprocessor 170 is connected to a portion 175 of the shared electrical bus 111.

The illustrated slave control circuitry 110 is connected to the portion 175 of the shared electrical bus 111 and includes the light array control circuitry 173 and may include a magnetic sensor 121 and may include a battery 174. The light array control circuitry 173 is connected to and directly modulates the one or more rows of LEDs 105. The light array control circuitry 173 may be composed of only commonly available shift registers and LED driver chips. The illustrated battery 174 is connected to the portion 175 of the shared electrical bus 111 which provides for sharing power between all arrays 101-104. The illustrated magnetic sensor 121 is connected to the shared electrical bus 111 which ultimately connects the sensors 121 on all arrays 101-104 to the single master electronic control circuitry 107.

The portion 175 of the shared electrical bus 111 is connected to the other arrays 101-104 in the light display apparatus 100 with the electrical connectors 165, 166 and in combination with all the arrays 101-104 in the set forms the complete shared electrical bus 111. The complete shared electrical bus 111 provides for electronic data transfer from the master electronic control circuitry 107 to the slave electronic control circuitry 110 on all the arrays 101-104, for sharing power between arrays 101-104, for transfer of electronic data between circuitry on any array 101-104 and any other array 101-104, and for sharing of electronic data between all of the arrays 101-104.

In an alternative embodiment, each array's slave electronic control circuitry 110 additionally includes a slave microprocessor which receives electronic data from the master microprocessor 170 and sends data to the light array control circuitry 173. This provides for reducing the number of pathways in the shared electrical bus 111 and for more complex modulation of the light.

In an alternative embodiment, a rotating electrical coupling "slip-ring" is wired to the shared electrical bus 111 and provides power from a source outside the rotating wheel 201. In such an embodiment, a battery is not needed in the light display apparatus 100 although a small battery may still be included to buffer the power provided from the outside source.

In an alternative embodiment, the wheel 201 to which the light display apparatus 100 is attached includes a commonly available hub-integrated electrical generator, and said generator is wired to the shared electrical bus 111 of the light display apparatus 100 so as to provide power to the light display apparatus 1000. In such an embodiment, a battery is not needed in the light display apparatus 100 although a small battery may still be included to buffer the power provided from the generator.

Although the illustrated embodiments shown are adapted for mounting on a bicycle 200, it should be understood that the light display apparatus 100 can also be mounted on any other suitable type of rotating wheel and/or any other suitable type of rotating devices.

It is noted that each of the features or attributes of the above described embodiments and variations can be used in combination with any of the other features and attributes of the above described embodiments and variations as desired.

From the foregoing disclosure it will be apparent the electronic display apparatus according to the present invention has the advantages that the linear bus or loop bus of the electrical pathways provide electrical connection between all arrays in the set, each individual array has only two direct electrical and mechanical attachments to other arrays, and each individual array is manufactured with identical or symmetrical mechanical and electrical connectors. Also an advantage, the loop bus provides two redundant pathways for electrical power and data between any two arrays in the set. In a bicycle application, the apparatus can experience severe mechanical shock and vibration, redundant electrical pathways reduce the chance of an electrical connectivity failure when using low cost commodity electrical connectors. Also as an advantage, the topology of electrical pathways between attached arrays provide for each array to share power with the others using no additional electronic components, the batteries being connected in series or in parallel through the electrical pathways. Further as an advantage, the rigid mechanical structure formed by the attached arrays provides the use of robust, easy-to-assemble and inexpensive commercial BTB electrical connectors between two mechanically attached arrays in the set, rather than cables. Further as an advantage, the rigid mechanical structure formed by the set of attached arrays fixes each array in a location and orientation in relation to the other arrays, the location and orientation of each array being a required configuration parameter for the microprocessor in order to properly create the persistence of vision display. Moreover as an advantage of the set of individual arrays which can be attached together into a rigid structure, the apparatus can be installed on the side of or between the spokes of a bicycle wheel without any disassembly of the wheel or bicycle. Moreover as an advantage, the set of arrays can be assembled on the side of or within a spoked bicycle wheel, and once assembled into a single rigid unit is attached to the bicycle wheel. Thus the unit can be attached to any combination of the hub, rim, and spokes of the wheel. Also as an advantage, the mechanical assembly and attachment of the arrays within a spoked wheel, use of relatively small boardto-board connectors, use of the circuit board as the primary structural element, and the two independently controlled rows of lights on either side of the arrays allows a large independent display area on both sides of the wheel simultaneously which is visible and relatively unobstructed over a wide viewing angle.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

What is claimed is:

1. A light display apparatus for mounting on a wheel, said apparatus comprising:
    a set of at least two individual elongated light arrays, at least one of the elongated light arrays being a master light array;
    wherein the elongated light arrays have two ends and at least one row of lights;
    wherein the elongated light arrays have mechanical connections proximate one of the ends to mechanically connect adjacent ones of the elongated light arrays and electrical connections proximate the mechanical connections to electrically connect adjacent ones of the elongated light arrays;
    wherein the set of individual elongated light arrays when connected mechanically at the mechanical connections form a single rigid assembly, the single rigid assembly being adapted to be attached to the wheel as a unit;
    wherein the set of elongated light arrays when connected electrically at the electrical connections form an electrically conductive pathway traversing each of the elongated light arrays in the set;
    wherein the electrically conductive pathway provides a single electrical bus by which electrical power and electronic data can be shared between all of the elongated light arrays, and by which electronic data can be transmitted from the master array to each of the other elongated light arrays without an individual direct electrical connection;
    at least one sensor mounted on the apparatus for determining angular velocity and position of the wheel; and
    a microprocessor mounted on the master light array and including a memory storing at least one of a display pattern and a display pattern generation computer code, the microprocessor modulating the rows of lights according to the display pattern or the display pattern generation computer code and sensed velocity and position of the wheel to form an image using persistence of vision of a viewer.

2. The apparatus of claim 1, wherein the electrical bus has the topology of a loop.

3. The apparatus of claim 1, wherein the electrical bus has the topology of a line.

4. The apparatus of claim 1, wherein the rigid assembly is adapted to be attached to the wheel by plastic cable-ties.

5. The apparatus of claim 1, wherein the at least one sensor additionally allows the determining of angular position of the rigid assembly with respect to either a fixed portion of the bicycle or ground.

6. The apparatus of claim 5, where the at least one sensor includes a 2-axis accelerometer.

7. The apparatus of claim 1, wherein the at least one sensor includes at least two magnetic sensors.

8. The apparatus of claim 1, wherein each of the elongated light arrays includes two rows of LEDs, one row on each side, with slave control circuitry connected to allow independent modulation of the two rows.

9. The apparatus of claim 1, wherein no single one of the elongated light arrays, including the master array, is operable by itself when disconnected from the other elongated light arrays in the set.

10. The apparatus of claim 1, further comprising at least one battery connected to the electrical bus such that the apparatus is fully operational without any additional external apparatus beyond the wheel it is attached to and a small fixed position magnet.

11. The apparatus of claim 1, further comprising a slave microprocessor on each of the elongated light arrays and which receives electronic data from the master microprocessor via the shared electronic data bus and modulates the proximate one of the elongated light arrays; and wherein the master microprocessor sends electronic data to the slave microprocessors and not modulating the light arrays directly.

12. The apparatus of claim 1, wherein the electrical connections between the elongated light arrays is made with a board-to-board connector, and a rubber spacer is fitted between the connected ones of the arrays and around the connector creating required spacing for the connector as well as a water and dust proof seal.

13. The apparatus of claim 1, wherein attaching the light arrays together into the rigid structure fixes the light arrays in a known location and orientation in relation to the other light arrays.

14. The apparatus of claim 1, wherein the light arrays include printed circuit boards on which all the electronic components and rows of lights are mounted and which are the primary structural components of the light arrays.

15. The apparatus according to claim 14, wherein the printed circuit boards are the only structural components of the light arrays.

16. The apparatus according to claim 14, wherein the electrical connections comprise board-to-board connectors.

17. A light display apparatus for mounting on a wheel having
    spokes extending between a hub and a rim, said apparatus comprising:
    a set of at least two individual elongated light arrays, at least one of the elongated light arrays being a master light array;
    wherein the elongated light arrays have two ends and at least one row of lights;
    wherein the elongated light arrays have mechanical connections proximate one of the ends to mechanically connect adjacent ones of the elongated light arrays and electrical connections proximate the mechanical connections to electrically connect adjacent ones of the elongated light arrays;
    wherein the set of individual elongated light arrays when connected mechanically at the mechanical connections form a single rigid assembly, the single rigid assembly being adapted to be attached to the spokes of the wheel as a unit;
    wherein the set of elongated light arrays when connected electrically at the electrical connections form an electrically conductive pathway traversing each of the elongated light arrays in the set;
    wherein the electrically conductive pathway provides a single electrical bus by which electrical power and electronic data can be shared between all of the elongated light arrays, and by which electronic data can be transmitted from the master array to each of the other elongated light arrays without an individual direct electrical connection;

at least one sensor mounted on the apparatus for determining angular velocity and position of the wheel; and a microprocessor mounted on the master light array and including a memory storing at least one of a display pattern and a display pattern generation computer code, the microprocessor modulating the rows of lights according to the display pattern or the display pattern generation computer code and sensed velocity and position of the wheel to form an image using persistence of vision of a viewer.

18. The apparatus of claim 17, wherein the individual elongated light arrays may be placed between the spokes of the wheel and then attached together fully contained between the spokes of the wheel, around the hub of the wheel and in the plane of the wheel.

19. A bicycle comprising:
a pair of rotating wheels each having spokes extending between a hub and a rim; and
a light display apparatus secured to one of the wheels and comprising:
a set of at least two individual elongated light arrays, at least one of the elongated light arrays being a master light array;
wherein the elongated light arrays have two ends and at least one row of lights;
wherein the elongated light arrays have mechanical connections proximate one of the ends and mechanically connecting adjacent ones of the elongated light arrays and electrical connections proximate the mechanical connections and electrically connecting adjacent ones of the elongated light arrays;

wherein the set of individual elongated light arrays form a single rigid assembly, the single rigid assembly attached to the spokes of the wheel as a unit;

wherein the set of elongated light arrays form an electrically conductive pathway traversing each of the elongated light arrays in the set;

wherein the electrically conductive pathway provides a single electrical bus by which electrical power and electronic data can be shared between all of the elongated light arrays, and by which electronic data can be transmitted from the master array to each of the other elongated light arrays without an individual direct electrical connection;

at least one sensor mounted on the apparatus for determining angular velocity and position of the wheel; and a microprocessor mounted on the master light array and including a memory storing at least one of a display pattern and a display pattern generation computer code, the microprocessor modulating the rows of lights according to the display pattern or the display pattern generation computer code and sensed velocity and position of the wheel to form an image using persistence of vision of a viewer.

20. The apparatus of claim 19, wherein the individual elongated light arrays are fully contained between the spokes of the wheel, around the hub of the wheel, and in the plane of the wheel.

* * * * *